O. L. INGRAM.
COMBINED TYPE WRITING AND COMPUTING MACHINE.
APPLICATION FILED OCT. 16, 1914. RENEWED SEPT. 9, 1918.
1,302,050.
Patented Apr. 29, 1919.
6 SHEETS—SHEET 1.
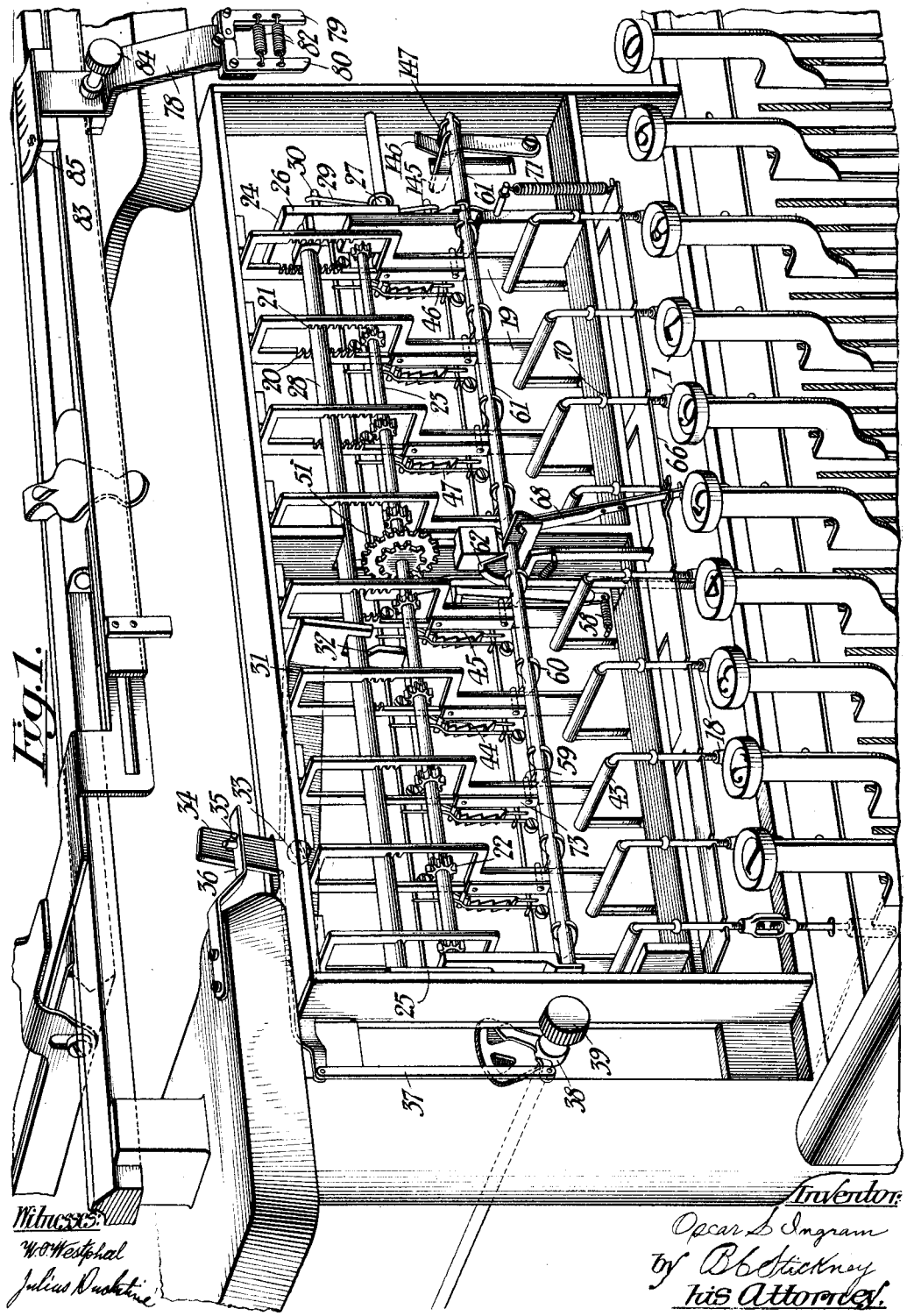

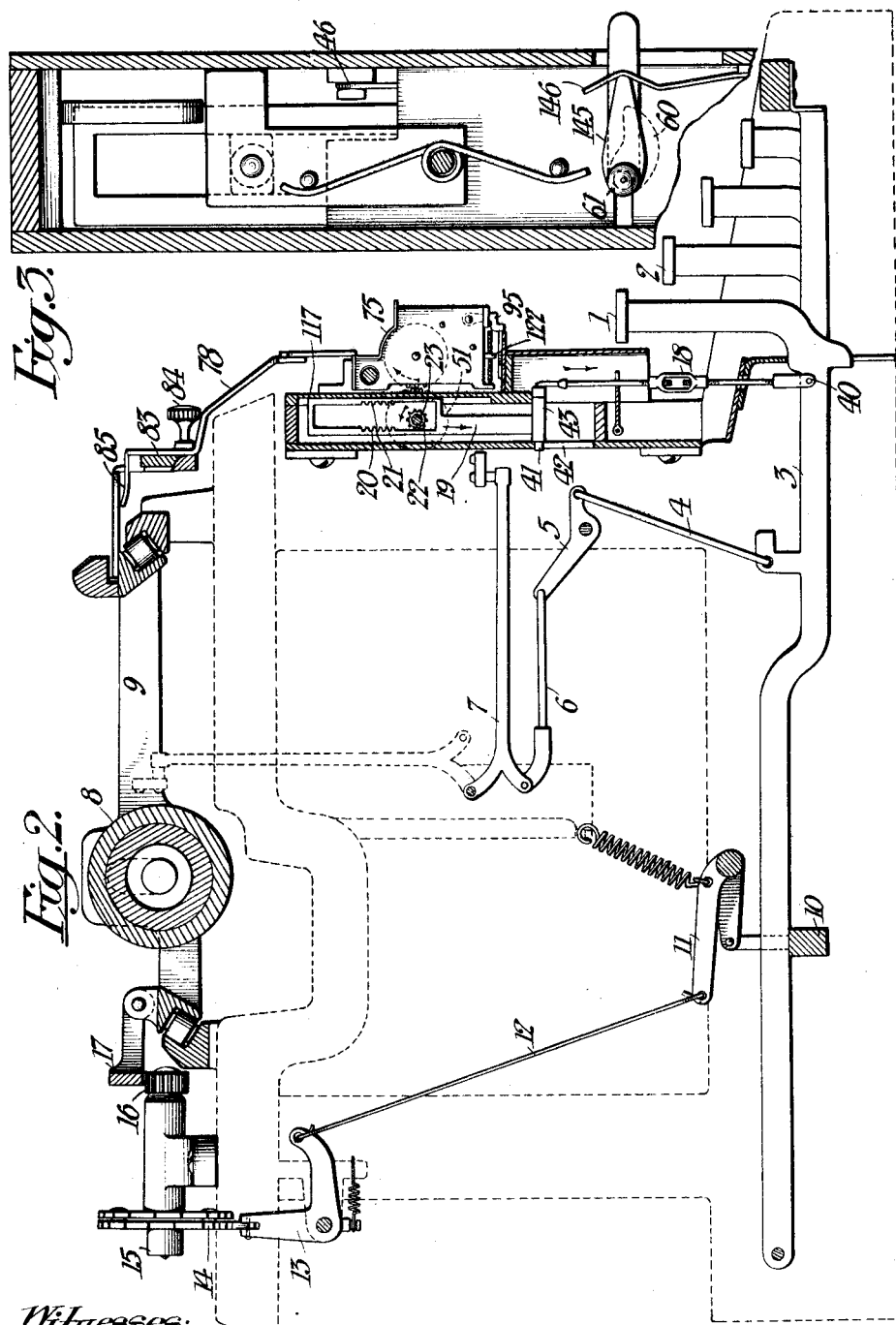

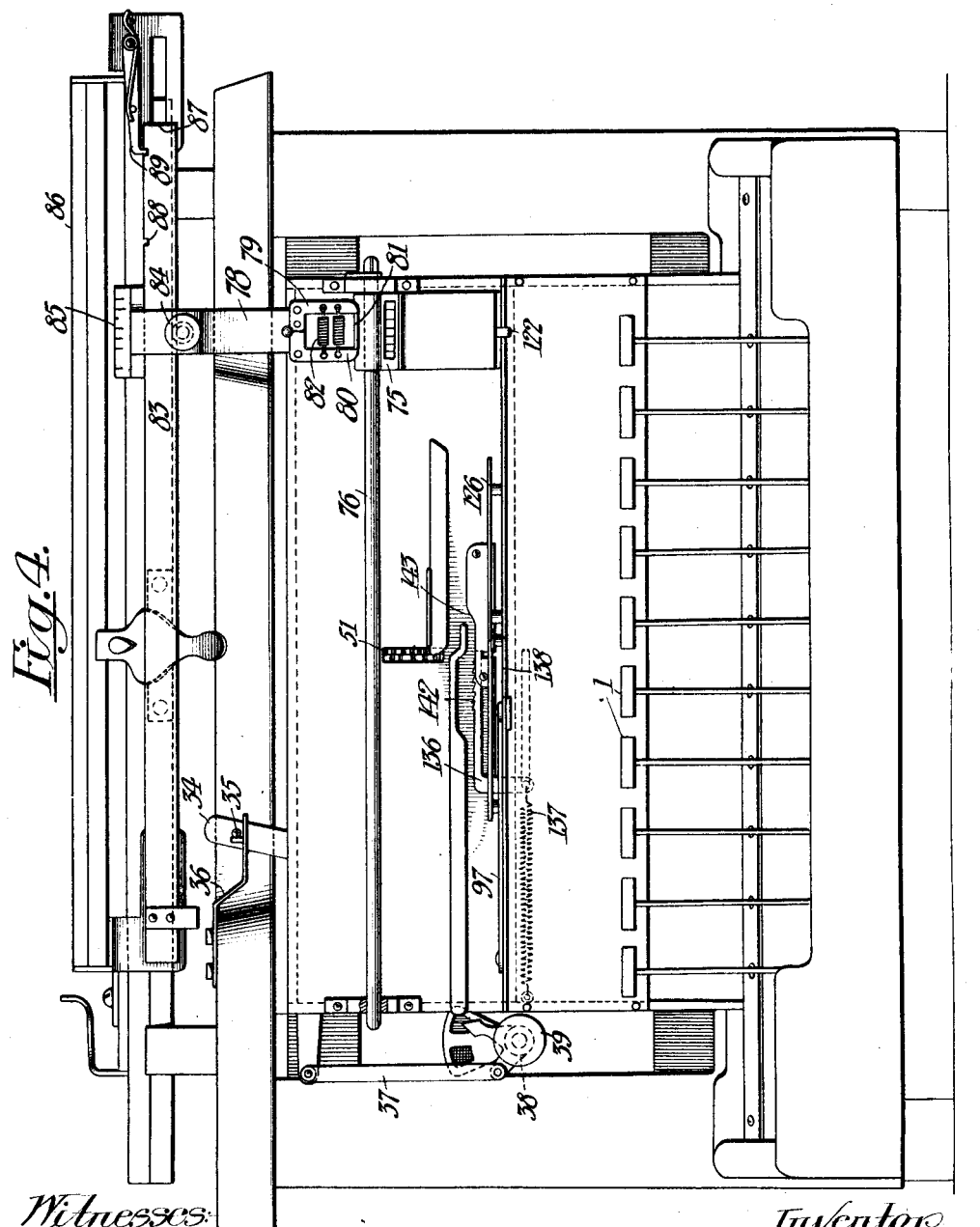

O. L. INGRAM.
COMBINED TYPE WRITING AND COMPUTING MACHINE.
APPLICATION FILED OCT. 16, 1914. RENEWED SEPT. 9, 1918.
1,302,050.
Patented Apr. 29, 1919.
6 SHEETS—SHEET 4.
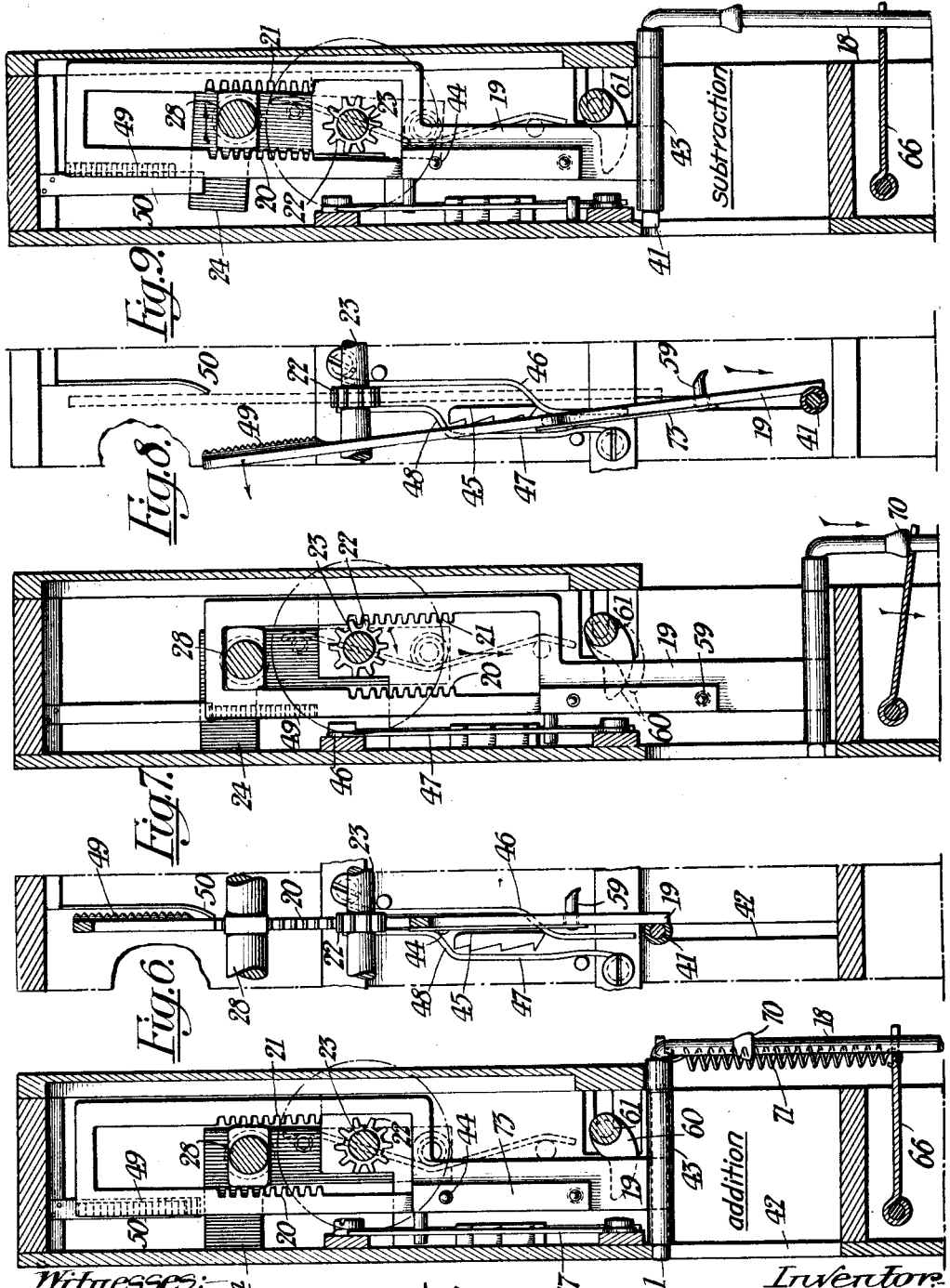

O. L. INGRAM.
COMBINED TYPE WRITING AND COMPUTING MACHINE.
APPLICATION FILED OCT. 16, 1914. RENEWED SEPT. 9, 1918.
1,302,050.
Patented Apr. 29, 1919.
6 SHEETS—SHEET 5.
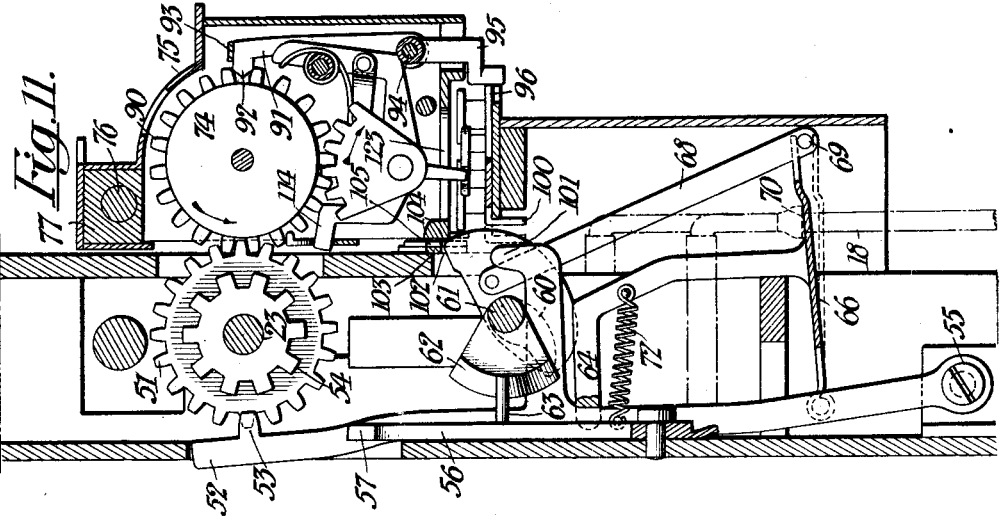

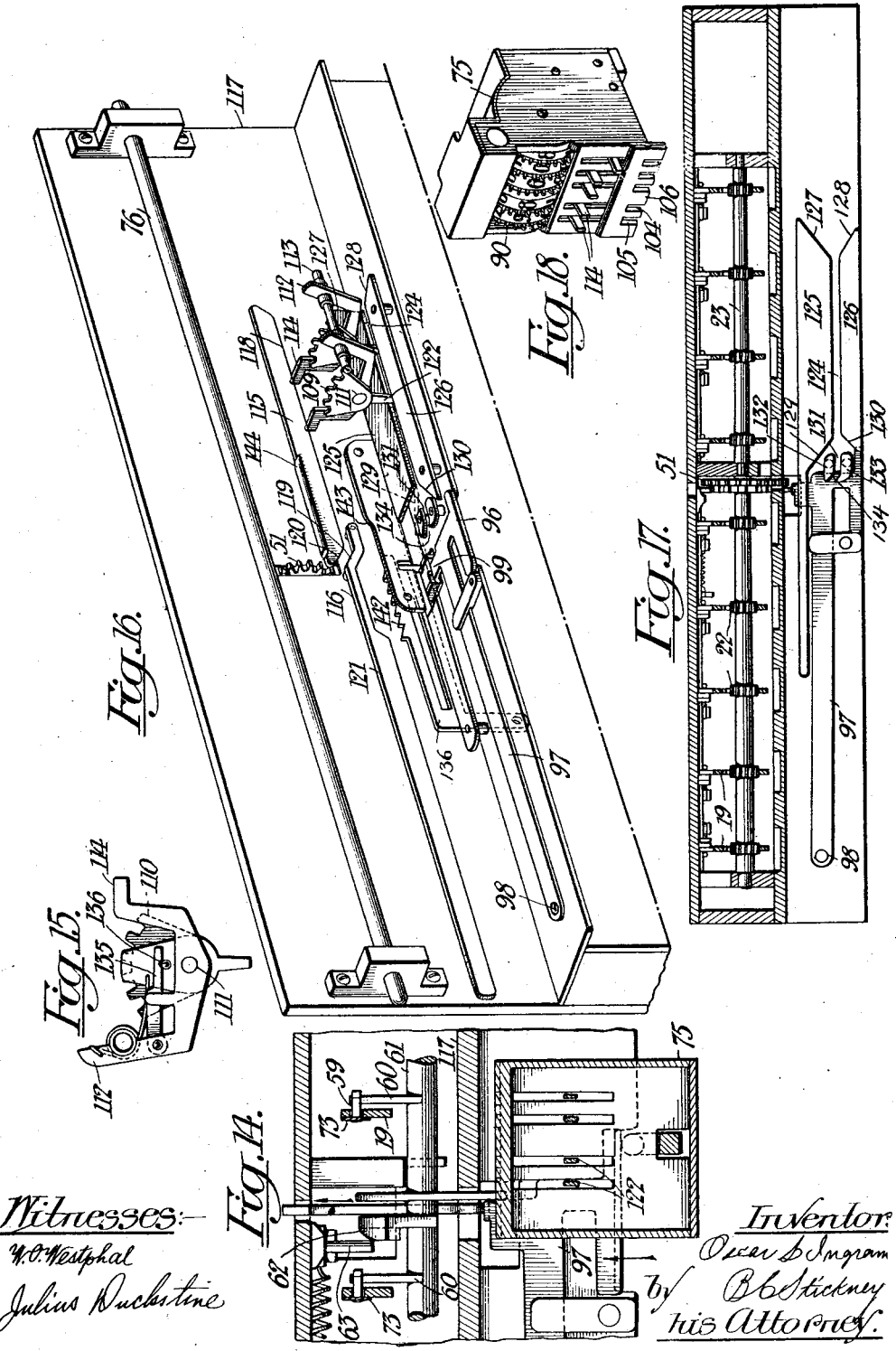

UNITED STATES PATENT OFFICE.

OSCAR L. INGRAM, OF WALLA WALLA, WASHINGTON, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,302,050.      Specification of Letters Patent.      Patented Apr. 29, 1919.

Application filed October 16, 1914, Serial No. 866,886. Renewed September 9, 1918. Serial No. 253,164.

*To all whom it may concern:*

Be it known that I, OSCAR L. INGRAM, a citizen of the United States, residing in Walla Walla, in the county of Walla Walla and State of Washington, have invented certain new and useful Improvements in Combined Type-Writing and Computing Machines, of which the following is a specification.

This invention relates to a combined type-writing and computing machine, and is applied more specifically to a key-driven master wheel type of machine.

In the present embodiment the computing wheels of the totalizer or computing head are brought step by step into register with a master wheel which is driven from the keys. The arrangement is such that duplex racks, one for each numeral key, may be alternatively brought into driving mesh with gears on the master wheel shaft, so as to drive the master wheel either forward or backwardly according to whether an addition or subtraction computation is being carried on. The racks vary in the number of teeth in a successive manner according to the values of the corresponding numeral keys which actuate them, so that they form, in effect, indicating or valuating mechanism to give fractions of rotations of the master wheel in exact correspondence with the values of the numeral keys in action. The actuating racks operate on the down stroke and clear out of driving mesh at the end of the down stroke, so as to be idle on their up stroke.

Tens-carrying mechanism for each computing wheel comes into play as the latter passes above the master wheel, and may operate to either side of a neutral position according to whether the carry is in an adding or a subtracting operation. The tens-carrying mechanism is neutralized, that is, brought back to an intermediate position, by a return movement of the carriage so as to be ready for a subsequent carrying operation. Guarding or locking means are provided to prevent operation of the numeral keys and the computing mechanism attached thereto after the totalizer has advanced in a computing zone and before it has been completely returned out of the computing zone, so as to prevent a possible incorrect computation due to a failure to carry, because of the carrying mechanism not being properly reset. An overthrow lock for the master wheel is provided, which is released at the initial down stroke of a numeral key. A lock for preventing a relative movement between the computing wheels and the master wheel during a rotation of the master wheel is also brought into play at the initial portion of the down stroke of a numeral key.

Other features and advantages will hereinafter appear.

In the accompanying drawings—

Figure 1 is a front perspective view with the cover plate of the computing mechanism removed to show the underlying structure.

Fig. 2 is a skeleton vertical section taken from front to rear.

Fig. 3 is an enlarged vertical section looking from right to left in Fig. 1, and showing the parts in their normal silent position.

Fig. 4 is a front view in elevation showing the totalizer in an extreme right-hand position out of register with the master wheel.

Fig. 5 is an enlarged vertical section looking from left to right in Fig. 1, and showing the actuating or valuating rack bar for the "9" key in its silent position.

Fig. 6 is a vertical section taken at right angles to Fig. 5, showing the means for disconnecting the actuating rack bar from its pinion, and also showing the full-stroke mechanism.

Fig. 7 is a view taken similarly to Fig. 5, except that the actuating rack bar has moved down its full distance and is just being shifted out of mesh with its pinion. The bars in this view are set for adding.

Fig. 8 is a vertical section taken similarly to Fig. 6, but showing the parts in their position illustrated in Fig. 7, with the driving rack bar in its full-line position just moved out of mesh with its pinion.

Fig. 9 is a view similar to Figs. 5 and 7, except that the valuating actuating rack bar is shifted to a subtracting position.

Fig. 10 is an enlarged vertical section taken from front to rear looking from left to right in Fig. 1, and showing one of the wheels of the totalizer in register with the master wheel, the master wheel being shown in a silent position with its overthrow lock in position; the tens-carrying mechanism also being shown in its depressed or silent position.

Fig. 11 is a view similar to Fig. 10, showing, however, a numeral key in actual action so that the overthrow lock for the master wheel has been silenced, the tens-carrying mechanism also being shown in its raised effective position but still occupying an intermediate neutral position before carrying.

Fig. 12 is a vertical section from right to left through the totalizer and looking from rear to front thereof. This view shows the relation of the tens-carrying units to the computing wheels.

Fig. 13 is a skeleton perspective view showing the relation of the overthrow lock to one of the computing wheels, and also showing parts of the tens-carrying units associated with that wheel and the next lower wheel, both units being shown in raised operative position.

Fig. 14 is a horizontal section showing the action of the mechanism which brings the various overthrow locks into play and also showing how the tails for the carry-over sectors project through the bottom of the totalizer casing.

Fig. 15 is a detail view in side elevation of one carry-over unit.

Fig. 16 is a fragmentary perspective view showing the mechanism for operating the tens-carrying units to bring them into play and to return them to intermediate normal position after carry-over actions.

Fig. 17 is a horizontal section showing the various driving bars for the master wheel, and also showing, in plan, the carry-over camways for the carry-over sectors.

Fig. 18 is a detached perspective view looking at a totalizer from the rear.

In the present embodiment the improvement is shown as applied to a Remington typewriting machine of well-known character. Numeral keys 1 (Fig. 2) and character keys 2 when depressed rock key levers 3 to draw on links 4, to rock bell cranks 5 so as to swing through the intermediary of links 6, type bars 7 up against the front side of a platen 8 mounted to rotate on a carriage 9. The carriage 9 may be given a step-by-step movement in any well-known manner as by a universal bar 10 underlying each of the key-levers 3, and connected to rock a bell crank 11, which draws on a link 12 to rock pawls 13 of an escapement mechanism, which includes escapement wheels 14 connected to a shaft 15, which also bears a pinion 16 meshing with a rack 17 carried by the carriage 9.

Each of the numeral keys 1, in addition to printing the digit corresponding thereto, effects a computing operation. For this purpose, as a numeral key 1 is depressed, it draws on a link 18, which pulls down on a valuating or actuating rack bar 19. There is one of these rack bars 19 for each of the numeral keys 1 from "1" to "9". Each rack bar 19 is duplex, and provided with duplicate racks 20 and 21 facing in opposite directions, and arranged to be brought alternatively into mesh with an associated one of a series of pinions 22 secured to a master-wheel shaft 23. The racks 20 and 21 are subtracting and adding racks, respectively, and face in opposite directions so as to drive the pinions 22 and the master-wheel shaft 23 in the direction of the arrow in Fig. 2 for subtraction, and in the direction of the arrow in Fig. 7 for addition. The racks 20 and 21 vary in linear magnitude, that is, in the number of teeth, so as to rotate the master-wheel shaft 23 in different amounts according to the value of the associated numeral key. For example, in the present instance, each of the racks 20, 21 for the "1" key is provided with one tooth; for the "2" key, two teeth; for the "3" key, three teeth, and so on up to nine teeth for the "9" key. It will thus be seen inasmuch as the pinions 22 have ten teeth, that the "1" key, through its rack bar 19, will rotate the master-wheel shaft 23 one-tenth of a revolution; the "2" key will rotate the master wheel shaft two-tenths of a revolution; the "3" key will rotate the master wheel shaft three-tenths of a revolution, and so on up to nine-tenths of a revolution for the "9" key. This, then, forms both an actuating and a valuating mechanism which will determine the extent of rotation of the master wheel shaft 23 according to the value of the particular numeral key 1 actuated.

In order to determine whether the racks 20 for a subtracting operation, or the racks 21 for an adding operation, shall drive the master wheel shaft 23, a shift frame 24 is provided (Figs. 1 and 5 to 9), which is shown to include side plates 25 and 26 pivoted at 27, and connected by a rod 28 extending through the bars 19 and between the racks 20 and 21. The portion of the rack bar 19 bearing the racks 20 and 21 is shown in the form of an inclosed quadrilateral, so that the racks 20 and 21 will be united for back and forth movement. The rod 28 fits somewhat snugly between the vertical reaches bearing the racks 20 and 21, so that when it is shifted either back or forth, it will shift all of the rack bars 19 back or forth. Normally, one or more springs 29, engaging pins 30 on the side plates 26 tend to hold the shift frame 24 in its rearmost position with the adding racks 21 in position to mesh with the pinions 22. However, the frame 24 can be swung forward as a whole, so as to disengage the adding racks 21 from the pinions 22, and bring the subtracting racks 20 into a position to mesh with the pinions 22.

To do this, there is provided a shifter 31 (Fig. 1) having a cam 32 to engage the rod 28 and move it forwardly against the tension of the springs 29. The shifter is shown in the form of a double bell crank lever pivoted at 33 and having an arm 34 with a pin 35 to engage a spring detent 36, whereby the shifter 31 and the shifting frame 24 may be locked in either position of adjustment.

The shifter 31 is connected by a link 37, to a bichrome shifting mechanism 38, so that it can shift the bichrome ribbon from printing black when adding to printing red when subtracting, and vice versa. The bichrome shift is provided with a handle 39 of its own, whereby it can be adjusted, and the action may be, if desired, reciprocal, so that by shifting the bichrome mechanism, the computing mechanism may be changed from adding to subtracting, and vice versa, to correspond with the color of printing.

In order to allow for the back and forth movements of the rack bars 19 when shifting to adding and subtracting, the connections of the links 18 to the numeral-key levers 3 are pivotal as seen at 40 in Fig. 2, with the axes admitting of a back-and-forth swinging movement of the links 18.

In the present instance, the driving action of the rack bars 19 when adding or subtracting, is effected on the down stroke of the numeral keys 1, and these rack bars are cleared at the end of the down strike so as to permit them to rise idly. This is accomplished by having the upper portion of each link 18 extended horizontally at 41, and guided for movement by having a portion thereof extending in a vertical slot 42. The horizontal portion or reach 41 forms a pivotal bearing about which the associated rack bar 19 may rock in a direction transverse to the planes of the racks 20 and 21, the rack bars 19 for this purpose being provided with sleeves 43 which envelop the horizontally-extending portions 41.

Normally the rack bars 19 are held in a position such that their racks 20 or 21 are in register with the pinions 22 so that during the down stroke of a numeral key 1, the associated pinion 22 and the master wheel shaft 23 will be driven. To follow this action, there is provided on each rack bar 19 a pin 44 (Figs. 1 and 5 to 9), which is normally located to the right side of a vertical guide 45 (Figs. 6 and 8). As the rack bar 19 descends, the pin 44 remains on the right side (Fig. 6) of the guide 45, until the key and its rack bar 19 approach the end of their down stroke, when a cam 46, shown in the form of a spring bent to form a yielding deflected surface, shifts the pin 44 and with it the rack bar 19 to the left, so as to come on the left side of the lower apex of the guide 45. Inasmuch as this shifting movement takes place somewhat close to the extension pivot 41 for the rack bar 19, the racks 20 and 21 will be shifted out of register with the pinion 22, and whichever rack happened to be in mesh with such pinion will be shifted out of mesh therewith as illustrated in Fig. 8.

When the numeral key 1 returns, forcing up before it its rack bar 19, the same will be forced to proceed upwardly from the position shown in Fig. 8 with its racks 20 and 21 clear of the pinion 22.

A spring 47 maintains the pin 44 in engagement with the left side of the guide 45, which is serrated in an upward direction, having its serrations or teeth, abrupt surfaces preventing downward movement of the rack bar 19 and its pin 44, thereby preventing the numeral key from being struck, and its rack bar 19 from being depressed before it has returned to its normal raised position. The spring 47 performs still another function in that it is bent or flexed at 48 to form a cam surface which will engage the pin 44, and positively shift the same to the right (Fig. 6), thereby bringing the rack bar 19 and its racks 20 and 21 once more into register with its associated pinion 22. This spring 47 shifts the pin 44 beyond the guide 45, so that at the next down stroke it will pass to the right of the same as before, with the racks 20 and 21 in register with the pinion 22. The springs 46 and 47 then, with the aid of the guide 45, form a shifting mechanism which insures each of the rack bars 19 being single acting, that is, acting solely on its down stroke.

Full-stroke mechanism is also provided for the down stroke of the numeral keys and their rack bars 19, in addition to the up stroke. This is obtained by providing on the side of each rack bar 19, a rack 49, engaged by a spring dog 50, which admits of downward movement of the rack bar 19, but prevents upward movement of the same.

It has thus far been shown how the master wheel shaft 23 is given a fractional portion of a rotation in correspondence with the values of the numeral keys 1 actuated, and either forwardly or backwardly according as to whether it is desired to add or subtract. The shaft 23 is provided with a master wheel 51, which is secured on the shaft so as to rotate amounts corresponding to the values of the numeral keys actuated. Normally the master wheel 51 is held against rotation when not being positively driven, (see Fig. 10) by an overthrow lock 52 having a tooth 53 arranged to engage between the teeth of a ten-toothed locking wheel 54 provided on the side of the master wheel 51. The overthrow lock 52 is shown in the form of a lever pivoted at 55 and normally held in its forward locking position by a cam shifting lever 56, having a wedge 57, which is forced in back of the overthrow lock 52 by a spring 58.

As each key is depressed, however, a pin 59 (Figs. 1, 5 to 9, and 14) comes into engagement on the down stroke with one arm 60 of a series of arms, one for each rack bar 19, secured to a rock shaft 61. This pin 59 first rocks the arm 60 and shaft 61, and then escapes therefrom on a continued movement of its associated numeral key 1.

Secured on the rock shaft 61, there is provided a cam 62, which swings down into engagement with a pin 63 on the cam shifting lever 56, and moves the latter against the tension of the spring 58, to a position from in back of the overthrow lock 52. The overthrow lock is positively thrown out by an arm 64 (Figs. 10 and 11), which has a projection 65 engaging with the overthrow lock 52. The arm 64 is connected to a universal rock plate 66, which in turn is connected to and operated by an arm 67 secured on the rock shaft 61, the connection being by a link 68 pivoted to the arm 67 and detachably connected by a fork-and-pin connection 69, to the universal rock plate 66.

It will thus be seen that as each key and its rack bar 19 are depressed, the associated pin 59 will rock the shaft 61 to first release the overthrow lock 52 by the action of cam 62 in removing the wedge 57, and then positively, through the arm 67, the link 68, the plate 66, and the arm 64, force the overthrow locking tooth 53 out of mesh with the locking wheel 54 on the master wheel 51. This all occurs just before the first tooth on either the rack 20 or 21 comes into mesh with its associated pinion 22, so that by the time the shaft 23 has started into rotation, the overthrow lock 52 for the master wheel will be out of action.

To bring in the overthrow lock 52 at the end of the down stroke of the numeral key, there is provided on each of the links 18, a shoulder 70 which engages the universal plate 66 and swings the same downwardly, the plate being slotted to admit of the passage of the links 18. This downward swinging movement is slightly below the normal position of the universal plate 66, which is usually held in its normal position by springs 71 (Fig. 1). Such excessive downward movement of the plate 66 tensions a spring 72, which joins the arm 64 with the overthrow lock 52, and draws the tooth 53 into mesh with the locking wheel 54 just as the drive of the master wheel shaft 23 is completed. In the meantime the particular pin 59 on the rack bar 19 in action has escaped off the end of its associated arm 60, permitting the cam shaft 61 and its cam 62 to return to their normal position, so that the spring 58 is free to act, bringing the wedge 57 once more in back of the overthrow lock 52. The active downward movement of the pins 59 and their idle upward movement are accomplished by swaging the ends thereof slightly downward so as to have the underside hooked as in Figs. 6 and 8 to insure positive engagement with the associated arm 60, while beveling the upper side to permit the outward camming of the pins 59 idly past the arms 60, which action is permitted by the pins 59 being floatingly mounted on springs 73 (Fig. 14).

The successive rotations of the master wheel 51 are transferred *seriatim* to a series of computing wheels 74 of a totalizer or computing head 75. To provide for the step-by-step relative movement between the master wheel 51 and the computing wheels 74, the totalizer 75 is mounted to travel step by step with the typewriter carriage 9. To enable this traveling movement of the totalizer or computing head 75, it is slidingly mounted on a rod 76 (Figs. 10, 11 and 16), which extends through a supporting block 77 provided on the totalizer 75. A bracket 78 (Figs. 2 and 4) is provided with a pair of jaws 79 and 80 which form a clutch arranged to grip an extension or lug 81 provided on the totalizer casing 75. One of these jaws, 79, may be fixed, and the other, 80, may be pivoted, the two being joined by a pair of strong springs 82 which while holding the totalizer 75 positively to the bracket 78 under all normal movements of the totalizer, will yield in case of obstruction, so as to drop the totalizer thereby preventing a destructive action. The bracket 78 is mounted on a rod 83, and may be adjustably secured therealong at any point by means of a set screw 84.

The position of the totalizer with respect to the letter spaces of the carriage, is determined by a scale 85, which may be used with reference to the normal typewriter carriage scale 86. The rod 83 is itself adjustably mounted as by lug-and-slot connections 87 on the carriage 9, the adjustment preferably being of major magnitude, so as to determine different computing zones in the same line of writing. This may be accomplished by providing notches 88 at intervals on the rod 83, which are engaged by a spring-pressed dog 89. By this latter arrangement, a single totalizer can be run for one computing zone to bring successively each computing wheel into register with the master wheel 51, and then set back a zone, so as to add to the number already exhibited by the totalizer, a second number in the same line. For the purpose of being driven by the master wheel 51, each computing wheel 74 is provided with a gear 90, which gears as the totalizer 75 moves step by step, come successively into engagement with the master wheel 51.

In order to prevent overthrow movements of the computing wheels 74 when driven, there is provided an overthrow locking mechanism 91, including individual dogs 92, one for each gear 90, and united as by a frame 93, so as to move in unison. The overthrow locking mechanism 91 is mounted to rotate about a shaft 94, and is provided with an arm 95, which projects down through the casing of the totalizer 75 to a position to be engaged by a shift rail 96. This shift rail 96 is provided on a lever 97 (Fig. 16), pivoted at 98, which lever also has an arm or lug 99 with a downward extension 100 projecting into the casing of the computing mechanism. Normally, the overthrow lock 91 for the computing wheels 74, and the shifting mechanism therefor, are held in the position shown in Fig. 10, by an arm 101 provided on the overthrow lock 52 for the master wheel. That is to say, when the master wheel overthrow lock 52 is in action, the arm 101 will be in its forward position shown in Fig. 10, holding the overthrow lock 91 for all of the computing wheels 74 in its locking position. When, however, the overthrow lock 52 is thrown out, as in Fig. 11, during the down stroke of the numeral key, the arm 101 will be withdrawn from engagement with the extension or lug 100, so that the teeth of the gears 90 when rotated, are free to cam out the overthrow lock 91 from between them, moving the extension 100 from the full-line position in Fig. 11, to the dotted-line position in the same figure.

The traveling movement of the computing wheels 74 and the totalizer 75 is prevented while the master wheel 51 is rotated to drive one of the computing wheels 74 by the arm 67 on the rock shaft 61, which also forms a lock coming up into a slot 102 (Fig. 11) in a fixed plate 103, and also into a slot 104 in the back plate 105 of the casing of the totalizer 75 (Fig. 18). It will be seen that there is one of the slots 104 for each of the computing wheels 74, and so positioned as to permit the entrance of the locking arm 67 when the associated computing wheel 74 is in proper register with the master wheel 51 and at no other time. It will be further noted that a large space 106 is provided between two of the slots 104, which corresponds with the location of the decimal point between dollars and cents computing wheels when this decimal point is at the printing point of the typewriting mechanism. This prevents the operation of any numeral key at this time, as the arm 67 will engage the back plate 105, and obstruct the complete depression of the numeral key.

When each computing wheel completes a revolution in one direction or the other, it is necessary to carry or borrow "1" according as to whether the operation is an adding or a subtracting one. The carry-over mechanism for this purpose includes on each computing wheel, a special carry-over tooth 107 (Fig. 13), which once in each revolution comes into engagement with an arm 108 of a carry-over unit 109. The direction of engagement depends on the direction of rotation of the computing wheel, and hence the direction of rocking of the arm 108 likewise depends on the direction of rotation of the computing wheel, so that the carry to or borrow from the next higher computing wheel will be effected in the same direction. This is accomplished by securing to the arm 108, a sector gear 110, which is pivoted at 111, and swings to either side of a normal intermediate position a sufficient amount to drive the next higher computing wheel back or forth one step, that is, one-tenth of a revolution. The sector 110 meshes with the gear 90 on the next higher computing wheel for this purpose.

Normally, however, the sector 110 is not in mesh with the gear 90, and the arm 108 is not within the sphere of operation of the special tens-carrying tooth 107. The sector and arm, however, are brought into range of the parts of the computing wheel 74 as the computing wheel, which a tens-carrying unit drives, advances to the position just higher in denomination than the computing wheel in register with the master wheel 51. This is accomplished by providing the pivot 111 for the sector 110 and the arm 108, on a floating support 112, which is pivoted at 113. The floating support 112 for each tens-carrying unit is provided with an extension 114, which is in the nature of a follower, and engages cam runs 115 and 116 (Fig. 16) provided on the face or cover plate 117 for the main computing mechanism.

Before the totalizer 75 comes into a computing zone and before any of the computing wheels 74 are in register with the master wheel 51, the followers 114 of the floating supports 112 all underlie the straight edge 118 of the cam run 115, so that the carry-over units are maintained in their depressed positions with the arms 108 and the sectors 110 beyond the range of action of the carry-over teeth 107 and the gears 90.

As the second highest computing wheel comes into register with the master wheel 51, the follower 114 for the carry-over unit started into action by this computing wheel, will be raised above a cam edge 119 on the cam run 116, which action is permitted by the upward beveling at 120 of the cam run 115. This then brings the arm 108 of the highest carry-over unit within the range of the special carry-over tooth 107 of the next highest computing wheel, so that the carry-over action can be effected to the highest computing wheel if necessary. After each computing wheel passes the master wheel 51, its carry-over unit will be maintained in action by the follower 114 riding on the upper straight edge 121 of the cam run 116. This will enable successive carry-over actions from two or more computing wheels to higher computing wheels.

After all of the digits of a number have been run into the computing wheels, it is necessary to return whatever carry-over units have effected a carry-over action, to a normal intermediate or central position ready to act in a subsequent computation to either side for addition or subtraction. This is accomplished by making use of the return or traveling movement of the typewriter carriage 9 and the totalizer 75.

There is on each of the carry-over units, preferably carried by the united arm 108 and sector 110, a tail 122 (Figs. 10, 11, 15 and 16). These tails project through slots 123 in the bottom of the casing of the totalizer 75 to a point where they may enter into a guiding channel 124 (Figs. 16 and 17) provided between guides 125 and 126. The guides 125 and 126 have inclined cam edges 127 and 128, which converge toward the channel 124 so as to direct the tails 122 therein. At the opposite end the guides 125 and 126 also have further inclined edges 129 and 130, which converge toward the channel 124. It will thus be seen that if at any time any of the tens-carrying sectors 110 with their arms 108 occupy an offset position to either side of their mid-position, they will be centralized or returned to such mid-position when the tails 122 enter the channel 124.

Beyond the camway formed by the inclined edges 129 and 130, there is provided a supplemental guiding channel 131, formed between two guides 132 and 133. This channel is spaced apart longitudinally from the channel 124, but in alinement therewith so that the tails 122 during the advancing movement of the totalizer 75, come successively into the channel 131.

As each tens-carrying unit passes the plane of the master wheel 51, as has been noted before, it is raised into action by its follower 114. To permit of this movement without disturbing the relation of the teeth of the sector gear 110 with respect to the teeth of the gears 90, the channel 131 turns backwardly as at 134 (Fig. 17). That is to say, as each tens-carrying unit swings about the pivot thereof, allowance is made for the arcuate movement of the sector 110 as a whole. The backturned portion of the channel 131 does not extend far enough to maintain a sector 110 and its arm 108 locked when the computing wheel associated with the arm thereof, is in register with the master wheel, thereby enabling this computing wheel to initiate a tens-carrying operation.

It will be seen then that the guiding edges 119, 120 are about in the same plane with the backwardly-turned guiding edges of the channel 131, so that they coöperate to bring into play properly each tens-carrying unit as it serves to advance or possibly advance the computing wheel 74 just beyond the master wheel 51.

Inasmuch as during one advancing movement of the totalizer 75, some of the tens-carrying units may have been brought into play and shifted to one side or the other of an intermediate position such as shown in Fig. 15, it is necessary to restore these tens-carrying units or bring them to a neutral mid-position which is determined in each instance by a spring-pressed detent 135 (Fig. 15), which engages a pin 136. This is done during the return movement of the typewriter carriage 9 and the totalizer 75 carried thereby, and it is not done until each computing wheel has passed the master wheel and enters the channel 124, having first engaged one or the other of the inclined guides 129 and 130 according as to whether the operation was an adding or a subtracting one.

The return movement of the totalizer and all of the computing wheels thereof, which insures the restoring of the tens-carrying units, is itself enforced before subsequent computing operations can take place, by a bar lock 136 (Figs. 4, 10 and 16). This bar lock 136 on any partial retrograding or return movement of the totalizer 75, returns therewith against the tension of a spring 137 to introduce the lower reach thereof into the path of movement of the locking arm 67, which normally enters into the slots 102 and 104 in the face plate 103 and the back plate 105 of the totalizer 75. This will prevent the complete action of a numeral key by preventing the rocking of the shaft 61.

The means for picking up the bar lock 136 consists in a catch 139 pivotally mounted at 140 in the casing of the totalizer 75, and normally held by a spring 141 in a position to engage the abrupt sides of ratchet teeth 142 (Fig. 16). There is one of these teeth 142 for each position of the totalizer 75 when in a computing zone, and thus for each computing wheel 74. The teeth 142 are beveled so that during an advancing movement of the totalizer, the catch 139 will slide idly past the same, but during a return movement will engage these teeth to drag the bar lock 136 with the totalizer, preventing any operation of the numeral keys during the return movement. The bar lock will also remain in position in case the totalizer stops after a partial return movement in a computing zone, so that if the tens-carrying mechanism has been operated, it will not be called upon to act when it is not in condition to act.

When the totalizer has cleared the computing zone, and all of the tails 122 have entered the centralizing channel 124, then a cam hump 143, which is in register with the point of convergence of the guides 129, 130, comes into engagement with the catch 139 and trips the same, permitting the spring 137 to return the bar lock 136 to an idle position, when the numeral keys and the computing mechanism can once more be freely operated.

The computing wheels 74 are locked before coming to the master wheel 51, and, in fact, justified, so as to properly mesh therewith when they do come into register with the master wheel 51, by a bar 144 provided on the upper side of the guide 115.

The position of the totalizer 75 and the computing wheels 74 thereof, with respect to the carriage 9, when attaching the totalizer to the carriage by means of the bracket 78, may be determined by manually rocking the shaft 61 to bring the locking arm 67 into one of the slots 104. To do this, the shaft 61 is provided with a hand lever 145 (Fig. 1), which extends through the rear of the casing for the computing mechanism. The shaft 61 is locked in a normal silent position by a detent spring 146 engaging a short arm 147 on the shaft 61.

To consider briefly the operation of the device, the totalizer 75 is started at the right after its position relative to the carriage 9 has been decided upon by an adjustment of the bracket 78, and, if necessary, of the rod 83. In writing the number to be computed, the carriage is first advanced to a computing zone to bring the proper letter space in register with the printing point. The numeral key is then struck which corresponds with the first digit of the number being computed. If the digit is being computed in the computing wheel of highest denomination, inasmuch as there is no computing wheel beyond it, there is no tens-carrying mechanism from it. The first tens-carrying unit will therefore be in a position with its tail 122 in the supplementary guiding channel 131. The tens-carrying unit will not as yet be raised to an operative position. The striking of the numeral key draws down on the associated valuating bar 19, which if in its adding position, will rotate the master wheel 51 an amount corresponding to the value of the numeral key actuated. The locks for the master wheel and computing wheels are thrown out of action as the key starts in its downward movement, and into play once more at the end of the down stroke of the key. The rack bar 19 returns idly, being shifted at the end of the down stroke to a disengaged position with respect to the associated pinion 22.

After the numeral key has returned, the carriage 9 will have been spaced one letter space, and the computing head or totalizer 75 traveling therewith will move the next computing wheel into register with the master wheel 51. At this time the first tens-carrying unit will be raised by its follower 114 engaging the cam edge 119, whereby the sector 110 will be moved up into mesh with the gear 90 of the highest computing wheel, and the arm 108 will be moved up within the range of the special tens-carrying tooth 107 on the computing wheel second highest in denomination. The numeral key is again struck, and the number corresponding to the value thereof run up into the second computing wheel. If by chance there were already a number exhibited by this computing wheel and the sum of the number added thereto is greater than "10," the special tens-carrying tooth 107, in adding, will shift the arm 108 so as to carry "1" to the highest computing wheel, the tail 122 of this tens-carrying unit being free for movement. This action is repeated for all the wheels of the computing head, until the computing head passes beyond the computing zone.

If it is desired to add another number in the same line of writing, the latch 89 can be adjusted from one of the notches 88 at the right, to one of the notches farther to the left. This action will necessitate the moving of the rod 83 to the right to bring the totalizer 75 to the right of the master wheel 51, so that by a further advancing movement of the carriage 9, the computing wheels 74 of the totalizer 75 will be brought successively into register with the master wheel. This admits of the running of another number written in the same line as the previous number, into the computing head or totalizer 75.

The second number may be added or subtracted according as to the exigencies of the work being done. If subtracting, the shifter 34 must be moved from its Fig. 1 position to the opposite limit of its throw, moving all of the valuating actuating rack bars 19 from their Figs. 1 and 5 position to their Figs. 2 and 9 position. The same down stroke of the keys in such a case will rotate the master wheel in the opposite direction. The numeral keys whether adding or subtracting, and no matter what their value, always have the same length of stroke, the rack bars 19 taking care automatically of the rotation of the master wheel 51 to correspond with the values of the numeral keys.

After a line is written the carriage 9 is returned carrying with it the totalizer 75. This and any other return movement of the totalizer 75, such as when the rod 83 is adjusted from one notch 88 to another, must be of such an extent that the totalizer is moved clear to the right of the master wheel 51 in order to insure the restoring or returning to a mid-position of all the sectors of the tens-carrying units.

If by accident the totalizer is not completely returned and it is attempted to strike a numeral key, the bar lock 136 will come into play no matter what point the carriage is returned from, whether from a partial advance through a computing zone or from a complete advance through a computing zone. The bar lock is automatically silenced however, when the totalizer 75 has completely passed to the right of the master wheel 51, at which time all of the tens-carrying units have been disconnected and re-centralized.

Variations may be resorted to within the scope of the invention, and portions of the improvements may be used without others.

Having thus described my invention, I claim:

1. The combination with gearing, of a series of duplex rack bars for driving gearing alternatively in one direction or the other, a shifting frame for moving said rack bars in either direction, including pivotally-mounted side plates and a rod extending through said rack bars and connecting said side plates, a cam engaging said rod to shift the same, and a lever for actuating said cam.

2. The combination with a totalizer and driving gears therefor, of a series of duplex rack bars for driving said gears, a series of keys for operating said duplex rack bars, and connections between individual rack bars and individual keys for enabling each key to operate its associated rack bar, said connections having a pivotal joint admitting of oscillatory movement of said rack bars to bring into play selectively one or the other of the racks thereon, and also having a pivotal joint admitting of oscillatory movements of said rack bars between operative and inoperative planes of travel.

3. The combination with a totalizer, and driving gears therefor, of a series of rack bars for driving said gears, said rack bars being duplex so as to drive said master wheel selectively in one direction or the other, a series of numeral keys for actuating said rack bars, and a linkage connecting each numeral key with its rack bar, each linkage having two pivotal joints, one permitting oscillatory movement of the associated rack bar in the plane of its drive, and the other permitting oscillatory movement of the associated rack bar to and from the plane of its drive, and at right angles to the plane of its drive.

4. The combination with a totalizer, of gearing for driving said master wheel, a series of rack bars for driving said gearing, a series of numeral keys for actuating said rack bars, a link pivotally connected to each key, so as to swing about an axis perpendicular to the plane of movement of the key, and a pivotal connection between each rack bar and the associated link, permitting a swinging movement of the rack bar in a plane at right angles to its plane of driving movement.

5. The combination with a totalizer, of driving gearing for said totalizer, a series of vertically sliding rack bars for actuating said driving gearing, a series of numeral keys for actuating said rack bars, and shifting means for disconnecting said rack bars from driving relation with said gearing by moving said rack bars transversely to their driving planes into ineffective returning planes.

6. The combination with a master wheel, of gearing for driving said master wheel, a rack bar for driving said gearing, means for shifting said rack bar into and out of mesh with said gearing, and means for shifting said rack bar into and out of alinement with said gearing.

7. The combination with a pinion, of a rack bar for driving said pinion, a guide for said rack bar, and spring means coöperating with opposite sides of said guide to first maintain said rack bar in register with said pinion and then shift said rack bar out of register with said pinion, so that said rack bar will have an active stroke and an idle stroke with respect to said pinion.

8. The combination with a pinion, of a reciprocating rack bar for driving said pinion, a pin on said rack bar, a fixed stationary member, and spring means forcing said pin to travel around said member so as to guide said rack bar in a closed path, part of the time in register with said pinion and part of the time out of register with said pinion.

9. The combination with a pinion, of a rack bar for driving said pinion, a pin on said rack bar, a fixed member for guiding said pin, and a pair of springs encompassing said fixed member and having deflecting portions to divert said pin to opposite sides of said fixed member, so as to swing said rack bar into and out of register with said pinion.

10. The combination with a master wheel, of a pinion connected to drive said master wheel, and a duplex rack bar for driving said pinion, having three types of movement, one to determine the character of rotation of said master wheel, another to determine the extent of movement of said master wheel, and the third to determine the active and inactive periods of said master wheel with respect to the movement of said rack bar.

11. The combination with a master wheel, of a lock for said master wheel, positive means for preventing displacement of said lock, means for disengaging said positive means, and positive means for disengaging said lock after said first-mentioned positive means has been disengaged.

12. The combination with a master wheel, of a lock for said master wheel, positive means for preventing displacement of said lock, means for disengaging said positive means, positive means for disengaging said lock after said first-mentioned positive means has been disengaged, and a spring tending to draw said lock into action.

13. The combination with a master wheel, of a lock for said master wheel, positive means for preventing displacement of said lock, means for disengaging said positive means, positive means for disengaging said lock after said first-mentioned positive means has been disengaged, a spring tending to draw said lock into action, and a second spring tending to draw said first-mentioned positive means into action.

14. The combination with a master wheel, of a series of actuating members for said master wheel, a lock for said master wheel, positive means for holding said lock in action, a cam for releasing said positive means, and a shaft universal to all of said actuating members for operating said cam.

15. The combination with a master wheel, of a series of actuating members for said master wheel, a lock for said master wheel, positive means for holding said lock in action, a cam for releasing said positive means, a shaft universal to all of said actuating members for operating said cam, and a second universal element common to all of said actuating members for operating said cam at another point in the movement of any of said members to bring said lock once more into play.

16. The combination with a master wheel, of a series of actuating members for said master wheel, a pin on each of said actuating members, a shaft, a series of arms on said shaft each within the range of action of one of said pins, and locking means for said master wheel controlled from said shaft.

17. The combination with computing mechanism, of actuating units for said computing mechanism, locking means for said computing mechanism, a shaft connected to control the operation of said locking means, a plurality of arms on said shaft, and pins, one on each of said actuating units, arranged to momentarily engage one of said arms to rock said shaft.

18. The combination with a master wheel, of locking means for said master wheel, an actuating unit for said master wheel, a rock shaft for controlling said locking means, an arm on said rock shaft, and a pin arranged to momentarily operate said arm on one stroke of said actuating unit, and to pass idly by said arm on the other stroke of said actuating unit.

19. The combination with a master wheel, of a lock for said master wheel, a rock shaft, a link connected to be actuated by said rock shaft, an arm connected to be actuated by said link and engaging said lock to disengage the same from its locking relation with respect to said master wheel, and a spring connecting said lock with said arm.

20. The combination with a master wheel, of a lock for said master wheel, a wedge arm for said lock, a cam for releasing said wedge arm, a shaft for actuating said cam, a link actuated by said shaft, and an arm actuated by said link, and engaging said lock to move said lock to its inactive position.

21. The combination with a master wheel, of a lock for said master wheel, a wedge arm for said lock, a cam for releasing said wedge arm, a shaft for actuating said cam, a link actuated by said shaft, an arm actuated by said link and engaging said lock to move said lock to its inactive position, a spring normally tending to draw said wedge arm into its active position, and a spring joining said second-mentioned arm with said lock.

22. The combination with a series of numeral keys, of a master wheel, a series of actuators, one for each of said numeral keys for driving said master wheel, a lock for said master wheel, a shaft for enabling the release of said lock, and a series of arms on said shaft, one for each of said actuators and operated thereby.

23. The combination with a pair of computing wheels of adjacent denominations, of a sector for driving the computing wheel of higher denomination, an arm united with said sector to be driven by the computing wheel of lower denomination, so as in turn to drive said sector and said computing wheel of higher denomination, and a floating support on which said sector and arm are pivotally mounted for moving said sector and arm into and out the range respectively of said higher and lower denomination computing wheels.

24. The combination with a computing wheel, of a sector gear for driving said computing wheel, said sector gear normally occupying an intermediate position so as to be capable of rotating said computing wheel a slight amount in either direction, and camming means, arranged at opposite sides of said sector gear for returning the latter gear to a normal intermediate position after an actuation in either direction.

25. The combination with a computing wheel, of a traveling tens-carrying sector gear for rotating said computing wheel in either direction for addition or subtraction, said sector gear normally occupying an intermediate position, and a fixed cam having converging surfaces for deflecting said sector gear to an intermediate position after having been actuated in either direction.

26. The combination with a pair of computing wheels, of tens-carrying elements for said computing wheels, one of said elements being driven by one of said computing wheels so that the other of said elements can drive the other of said computing wheels, shifting means for returning said elements to a normal position after a carry-over operation, and a floating support for said elements arranged to bring said elements within the range of said computing wheels for a carry-over operation, and to shift said elements beyond the range of said computing wheels when being returned to a normal position.

27. The combination with a series of computing wheels, of traveling tens-carrying units for said computing wheels, each of said units including carry-over means to be driven by one computing wheel to drive the next higher computing wheel, a support for said carry-over means, said carry-over means normally occupying an intermediate position, to either side of which it can be driven to effect a tens-carrying or a tens-borrowing operation, and a pair of guides forming a channel therebetween and having converging surfaces engaging said carry-over means to return the same to an intermediate position after a carry-over operation.

28. The combination with computing wheels, of a carry-over unit for said computing wheels including driving means for effecting a carry from one computing wheel to another, a floating support for enabling a relative movement between said driving means and said computing wheels so as to dispose the same in or out of range of each other, and driving means for normally maintaining said driving means in an intermediate position and arranged to allow for swinging movements of said driving means in shifting into or out of range of said computing wheels.

29. The combination with a series of computing wheels, of actuating means for said computing wheels, said computing wheels and said actuating means having a relative movement to bring the same within range of each other, tens-carrying units for said computing wheels including driving means for effecting a carry-over operation between adjacent computing wheels, and a floating support for permitting the in and out movements of said driving means, said driving means normally being out of range of said computing wheels, and shifting means for adjusting each floating support as a computing wheel comes into range of said actuating means to bring the driving means from such computing wheel into the range thereof and of the next higher computing wheel.

30. The combination with a series of computing wheels, of actuating means for said computing wheels, said computing wheels and said actuating means having a relative movement to bring the same within range of each other, tens-carrying units for said computing wheels including driving means for effecting a carry-over operation between adjacent computing wheels, and a floating support for permitting the in and out movements of said driving means, said driving means normally being out of range of said computing wheels, shifting means for adjusting each floating support as a computing wheel comes into range of said actuating means to bring the driving means from such computing wheel into the range thereof and of the next higher computing wheel, and guiding means normally maintaining said driving means in an initial position from which it will be shifted in effecting a carry-over operation, said guiding means freeing said driving means for action as the floating support therefor brings the same within the range of the computing wheel it drives and of the computing wheel which drives it.

31. The combination with a series of computing wheels, of actuating means for said computing wheels, said actuating means and said computing wheels having a relative movement to bring the same within reach of each other, traveling tens-carrying units for said computing wheels including driving means between each two adjacent computing wheels, and a floating support for each driving means, guiding means for bringing said driving means to an initial position after a carry-over operation and maintaining said driving means in such position up to the range of said actuating means, and a cam track maintaining said driving means in an inactive position up to the range of said actuating means, and bringing said driving means to an active position within the range of said actuating means.

32. The combination with a series of computing wheels, of tens-carrying units for said computing wheels, each tens-carrying unit including a floating support and driving means mounted on said support to connect adjacent computing wheels, guiding means for said floating support, and guiding means for said driving means, both of said guiding means having a dip at substantially the same zone.

33. The combination with a series of computing wheels, of tens-carrying units for said computing wheels, a guide channel for said tens-carrying units, and a supplementary guide channel for said tens-carrying units in line with, but spaced apart from said first-mentioned channel.

34. The combination with a pair of computing wheels, of a tens-carrying unit for said computing wheels, said tens-carrying unit including a floating support, a sector gear pivotally mounted on said support, an arm pivotally mounted on said support and connected to drive said sector gear, and a tail for returning said sector gear after a driving movement to its initial position.

35. The combination with a series of computing wheels, of a master wheel for actuating said computing wheel, a lock for said master wheel, an arm on said lock, a shift rail, a lever connected to said shift rail, an extension on said lever in the path of movement of said arm, and a lock for said computing wheels operated by said shift rail whereby said last-mentioned lock may be controlled from said first-mentioned lock.

36. The combination with a totalizer, of actuating means for said totalizer, said actuating means and said totalizer having a relative traveling movement to bring the same within range of each other, and locking means for preventing an operation of said actuating means after an active relative movement between said totalizer and said actuating means and before a complete return movement therebetween.

37. The combination with a totalizer, of actuating means for said totalizer, said actuating means and said totalizer having a relative traveling movement to bring the same within range of each other, and a guard brought into play during the return relative movement after an active movement, for preventing computing operations on a partial return movement.

38. The combination with two primary elements, to wit, a totalizer and actuating means for said totalizer, said primary elements having a relative traveling movement, and a guard permitting computing actions on advancing relative movements between said primary elements, and preventing computing actions until said primary elements have had a complete return relative movement after any active relative movement.

39. The combination with a series of computing wheels, of actuating mechanism for said computing wheels, carry-over units for said computing wheels normally set in a position for action and acting by moving to an unset position, restoring mechanism for said carry-over units, and guarding means for preventing the driving of a computing wheel when the carry-over unit therefrom is in an unset position.

40. The combination with two primary elements, to wit, a totalizer and actuating means for said totalizer, one of said primary elements traveling relatively to the other, of a lock preventing computing actions in a computing zone when said traveling element has partially moved in a return direction.

41. The combination with two primary elements, to wit, a totalizer and actuating means for driving said totalizer, one of said primary elements having a traveling movement to determine a computing zone, of a lock traveling with said traveling element during a return movement thereof in a computing zone so as to prevent computing actions during such return movement.

42. The combination with two primary elements, to wit, a totalizer and actuating means for driving said totalizer, one of said primary elements traveling so as to have a relative movement with respect to the other of said primary elements, and so as to determine a computing zone, of a lock for preventing computing actions, and a pick-up on said traveling element engaging said lock when said traveling element is moved in one direction so as to prevent computing operations during such movement.

43. The combination with a totalizer having computing wheels, of actuating means for driving said computing wheels, a lock for preventing operation of said actuating means, and a pick-up on said totalizer for actuating said lock at any computing-wheel interval in a computing zone.

44. The combination with a totalizer including computing wheels, of actuating means for driving said computing wheels, a lock for preventing the operation of said actuating means, said lock having ratchet teeth facing in one direction, and a pick-up on said totalizer engaging said ratchet teeth when said totalizer moves in one direction so as to bring into play said lock.

45. The combination with a totalizer, of actuating means for said totalizer, a lock for preventing operation of said actuating means, a pick-up on said totalizer for bringing said lock into play, and a trip for disengaging said pick-up.

46. The combination with two primary elements including a totalizer and actuating means for said totalizer, said primary elements having a relative traveling movement to determine a computing zone, of a lock for preventing computing action by said actuating means and said totalizer, pick-up means for bringing said lock into play in a computing zone, and a trip for releasing said lock at the end of a computing zone.

47. The combination with a totalizer, of a master wheel for actuating said totalizer, said totalizer traveling relatively to said master wheel, a lock, a spring normally holding said lock ineffective, a pick-up arranged to operatively engage said lock solely during a return movement of said totalizer, and actuate said lock against the tension of said spring, and tripping means for said pick-up enabling the releasing of said lock by said spring.

48. The combination with a series of computing wheels, of actuating mechanism for said computing wheels, traveling tens-carrying mechanism for said computing wheels, means for resetting said tens-carrying mechanism at a particular zone in the travel thereof after having once been in operation, and actuating means for preventing the driving of said computing wheels after an actuation of the tens-carrying mechanism associated therewith until said tens-carrying mechanism has re-arrived at the resetting zone.

49. The combination, with a series of computing wheels; of a master wheel for driving said computing wheels; a locking member for said master wheel; a lock for said computing wheels; and an arm on said master wheel locking member acting to hold the computing wheel lock in action so long as said locking member remains in action, but releasing said computing wheel lock when said locking member is released.

50. The combination, with a series of computing wheels; of a master wheel for driving said computing wheels; a locking member for said master wheel; a lock for said computing wheels; a shift rail for the computing wheel lock; and an arm on said master wheel locking member coöperative with said shift rail to maintain the computing wheel lock in action so long as the master wheel locking member remains in action, and to release said computing wheel lock when said master wheel locking member is released.

51. In a combined typewriting and computing machine, the combination, with a carriage arranged to travel step by step; of two primary elements, to-wit: a totalizer, and actuating means therefor, one of said elements being arranged to travel relatively to the other; and a yielding clutch connection between said carriage and said traveling element acting normally to transmit the step-by-step movement of the carriage to the traveling element, but automatically releasing said traveling element when the movement of the latter is obstructed.

52. In a combined typewriting and computing machine, the combination, with a carriage arranged to travel step by step; of two primary elements, to-wit: a totalizer, and actuating means therefor, one of said elements being arranged to travel relatively to the other; and a yielding clutch connection between said carriage and said traveling element, embodying fixed and movable members carried by said carriage and arranged to engage said traveling element, so as to normally transmit the step-by-step movement of the carriage to the traveling element, but automatically releasing the latter when the movement thereof is obstructed.

53. In a combined typewriting and computing machine, the combination, with a carriage arranged to travel step by step; of a traveling totalizer; a support along which the totalizer is arranged to travel; a master wheel for actuating the totalizer wheels; and a yielding clutch connection between said carriage and said totalizer, acting normally to transmit the step-by-step movement of the carriage to the totalizer, but automatically releasing the latter when the movement thereof is obstructed.

54. In a combined typewriting and computing machine, the combination, with a carriage arranged to travel step by step of a traveling totalizer having a projection thereon; a support along which the totalizer is arranged to travel; a master wheel for actuating the totalizer wheels; and a yielding clutch connection between said carriage and said totalizer, embodying fixed and movable, spring-controlled jaws arranged to grip said projection, so as to normally transmit the step-by-step movement of the carriage to the totalizer, but automatically releasing the latter when the movement thereof is obstructed.

55. The combination, with a set of numeral keys; of a set of skeleton racks, one for each key, arranged above said keys and embodying, each, spaced front and rear rows of oppositely-facing teeth, the number of which corresponds to the value of the associated key; a set of pinions, one for each rack, disposed between said rows of teeth, so as to be driven thereby alternatively in one direction or the other; an upstanding link connection between each key and its associated rack, to drive the latter from the former, said link having a horizontally-offset upper portion whereon the lower end of the rack is pivotally mounted both for backward and forward movement in the plane of its driving movement to control the direction of drive of the associated pinion, and for movement in a plane at right angles to the plane of its driving movement to bring the rack into and out of alinement with said pinion; and separate means for controlling the two movements of the racks.

56. The combination, with a master wheel, and a series of actuating member therefor; of a lock for said master wheel; a member engageable with said lock to positively hold the same in action; a shaft universal to all of said actuating members for operation thereby; and a pair of instrumentalities carried by said shaft for successively disengaging said holding member and said lock.

57. The combination, with a master wheel, and a series of actuating members therefor; of a lock for said master wheel; a wedge engageable with said lock to positively hold the same in action; a device for disengaging said wedge; and means universal to all of said actuating members for operating said disengaging device.

58. The combination, with a master wheel, and a series of actuating members therefor; of a lock for said master wheel; a wedge engageable with said lock to positively hold the same in action; a shaft universal to all of said actuating members for operation thereby; an arm for moving said lock into its inactive position; and separate means operated successively by said shaft for disengaging said wedge and shifting said arm.

OSCAR L. INGRAM.

Witnesses:
EVERETT J. SMITH,
EDWARD C. MILLS.

Copies of this patent may be obtained for five cents each, by addressing the "Commissioner of Patents, Washington, D. C."